United States Patent [19]

Hirschkorn

[11] Patent Number: 4,824,353
[45] Date of Patent: Apr. 25, 1989

[54] EXTRUDER HEAD

[75] Inventor: Ingo Hirschkorn, Neu Wulmstorf, Fed. Rep. of Germany

[73] Assignee: Fried. Krupp Gesellschaft Mit Beschrankter Haftung, Essen, Fed. Rep. of Germany

[21] Appl. No.: 126,412

[22] Filed: Nov. 25, 1987

[30] Foreign Application Priority Data

Nov. 27, 1986 [DE] Fed. Rep. of Germany ....... 3640527

[51] Int. Cl.$^4$ ...................... B29C 47/18; B29C 47/16
[52] U.S. Cl. ..................................... 425/190; 425/461
[58] Field of Search ................ 425/190, 131.1, 376 R, 425/461, 462, 463, 466

[56] References Cited

U.S. PATENT DOCUMENTS

| | | | |
|---|---|---|---|
| 4,137,027 | 1/1979 | Rüger | 425/462 |
| 4,358,261 | 11/1982 | Ohki | 425/131.1 |
| 4,548,568 | 10/1985 | Herbert et al. | 425/131.1 |
| 4,619,599 | 10/1986 | Herbert et al. | 425/463 |
| 4,652,224 | 3/1987 | Golisch | 425/131.1 |
| 4,666,392 | 5/1987 | Gerloff et al. | 425/131.1 |
| 4,683,095 | 7/1987 | Tulonen et al. | 425/131.1 |

FOREIGN PATENT DOCUMENTS 2622011 8/1977 Fed. Rep. of Germany .
2236363 6/1979 Fed. Rep. of Germany .
2166684 5/1986 United Kingdom .

*Primary Examiner*—Willard Hoag
*Attorney, Agent, or Firm*—Herbert Dubno

[57] ABSTRACT

The extruder head has a hydraulic cylinder for the movable upper head member and/or the movable lower head member attached to each side of a stationary head member rigidly whose piston rod is extendable in the direction of the movable head member. Between the free ends of the piston rods and the associated movable head member there is provided a releasable connection means under tension. This connection means comprises at least two radial projections on the piston rod distributed uniformly about the circumference of the piston rod and a passage corresponding to the shape of the projection with a contacting surface in and/or on the associated head member. To loosen or release the connection means the piston rod is rotated about half a partial angle determined by the number of projections.

8 Claims, 5 Drawing Sheets

EXTRUDER HEAD

FIELD OF THE INVENTION

My invention relates to an extruder head and, more particularly, to an extruder head with at least one pivotable extruder head member.

BACKGROUND OF THE INVENTION

An extruder head can have at least one pivotable head member rotatable about an axis, a stationary head member and, on each side of the extruder head, a hydraulic cylinder for clamping the pivotable head member to the stationary member to form the extrusion head.

In this known extruder head the individual head members are forced together into an operable unit by a side-mounted tension frame. The tension frame is acted on by hydraulic cylinders which are supported on or braced against the stationary central extruder head member. The tension frame has either two conical clamping surfaces (see, for example, German Open Patent Application No. 34 30 062) or hooklike clamps (see German Open Patent Application No. 17 29 618) which engage on the socalled brackets or short projections which are positioned on the sides on the pivotable head members.

In each case the tension frame must be laterally pivotable when the pivotable head members are to be raised or lowered to open the stock passage. However the lateral pivoting of the very wide tension frame requires considerable space. Moreover the hydraulic cylinder must, in as much as it must pivot with the pivoting frame (see German Open Patent Application No. 17 29 618), be connected by a flexible tube with a pressure source which causes considerable problems at the conventional high pressures of about 500 bar with the materials used for the apparatus.

A simple extruder head with two pivotable head halves is known as described in German Open Patent Application No. 24 57 532. The two extruder head halves have a joint plane of separation going through the axis of the extruder which is coincident with additional pressing surfaces on the front side of the extruder.

In this known extruder each hydraulic cylinder is pivotally connected centrally on top of and on the bottom of the cylinder of the screw extruder. Each hydraulic cylinder with its piston rod operates on a twin lever for release and clamping the magazine or housing and the shaping strip and acts to open, close and secure the head members. This closing system is limited to an extruder head with two pivotable head members which must pivot laterally for opening and closing of the head members, also for clamping the extruder head.

OBJECTS OF THE INVENTION

It is an object of my invention to provide an improved simple or multiple extruder head which will overcome drawbacks of earlier systems.

It is also an object of my invention to provide an improved extruder head with at least one pivotable head member rotatable about an axis.

It is another object of my invention to provide an improved simple or multiple extruder head which does not have a bulky laterally pivotable clamping device.

It a further object of my invention to provide an improved simple or multiple extruder head in which the clamping of the individual extruder head members can be effected independently of the clamping of the shaping strip and the magazine.

SUMMARY OF THE INVENTION

These objects and others which will become more readily apparent hereinafter are attained in accordance with my invention in an extruder head with two pivotable head members each swingable about an axis on a respective side of a stationary head member and, on each side, a respective hydraulic cylinder for clamping the pivotable head member against the stationary member to form therewith an operable unit.

The hydraulic cylinders are attached rigidly on each side of the stationary head member and each of the hydraulic cylinders is associated with one of the pivotable head members (in an extruder head with pivotable intermediate members: with a respective one of the outer pivotable head members).

The piston rod of the hydraulic cylinder is extendable in the direction of the pivotable head member or the outer pivotable head member which contacts on the stationary head member and/or on an intermediate member, if present, and between the free end of the piston rods and the head member, or the outer pivotable head member if present, a releasable connection means acting under tension is provided between the pivotable head member and the piston rod.

Thus in my invention each pivotable (outer) head member, i.e. each upper and/or lower pivotable head member, is associated with an individual pair of hydraulic cylinders and because of that and by the omission of the tension frame and the moving parts associated with it, a considerable saving in the cost of the apparatus is attained. With a multiple extruder head with at least two extruders it is also possible to open and to clamp the head members independently of each other and by that to clean one or more stock passages independently of another stock passage.

Of course a clamping device in a mechanism with a two part die mold with two pivotable die halves is described in British Open Patent Application 2 166 684 in which the die support of one die half has a nonrotatable coupling member with a "key like opening" and the die support of the other die half has a clamping cylinder with a rotatable push rod with a coupling cam corresponding to and fitting the "key opening".

The coupling halves are unlocked and moved from each other to take out the molded products after each injection molding process. After taking away the molded products the die halves are again brought together and locked and/or clamped to make the next molded product.

The motion of the die halves occurs linearly toward each other. The moving device moves the die halves together until they come to rest and at the end of the motion pushes the nonrotatable coupling member on the coupling member with the rotatable coupling cam. The coupling cam next in the course of an additional linear motion is rotated by a fixed link member and the coupling is thus prepared for clamping.

The linear motion of the tool parts assumed with the clamping device according to British Open Patent Application No. 2 166 684 does not occur in the extruder head described above in which the pivotable head members are pivotable about an axis. Thus the design of the clamping device according to British Open Patent Application No. 2 166 684 does not suggest itself for the extruder head of the invention.

Many advantageous specific embodiments can be described within the framework of my invention. In one specific embodiment, the piston rods can have at least two radical projections distributed uniformly circumferentially with a pressing surface directed toward the hydraulic cylinder. The pivotable head member, if necessary the outer pivotable head member, has a passage on each side corresponding in shape to the projection with a contacting surface facing away from the hydraulic cylinder. The piston rods are rotatable by a turning device or rotator about half a partial angle determined by the number of the projections. A simple connection means between the piston rod of the hydraulic cylinder and the associated head member results. The piston rod only experiences a substantially force-free and stress-free rotation of about a half of a partial angle determined by the number of projections.

The structure of the passage and the contacting surfaces of the moving head members are, with regard to rigidity, especially good when the passage is formed by an opening suitable for the projections in the associated head member with an undercut recess and the contacting surface of the head member is formed by extension of the opening into the recess. Another embodiment of my invention is especially simple and particularly advantageous for small units. In this embodiment the passage and the contacting surface are formed by two lateral projections.

In another embodiment of my invention the turning device or rotator has a cam groove arrangement with a plurality of branched grooves, for embodiment in a cam sleeve, and guide rollers. A rotation of the piston rod is caused when at least one of the guide rollers engaged in one inclined running curved section of the branched grooves runs into another of the guide sections running axially parallel with said piston rods. This can happen when a guide sleeve attached to the piston rod with the branched grooves engages the guide rollers. The turning device or rotator formed according to this embodiment allows a rotational motion with comparatively little longitudinal motion.

In a further embodiment the turning device or rotator is simply a rotating motor and no longitudinal motion is required so that the recess formed for the hammer like head end of the piston rod can be formed with a comparatively small cavity or hole in the pivotable head member.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
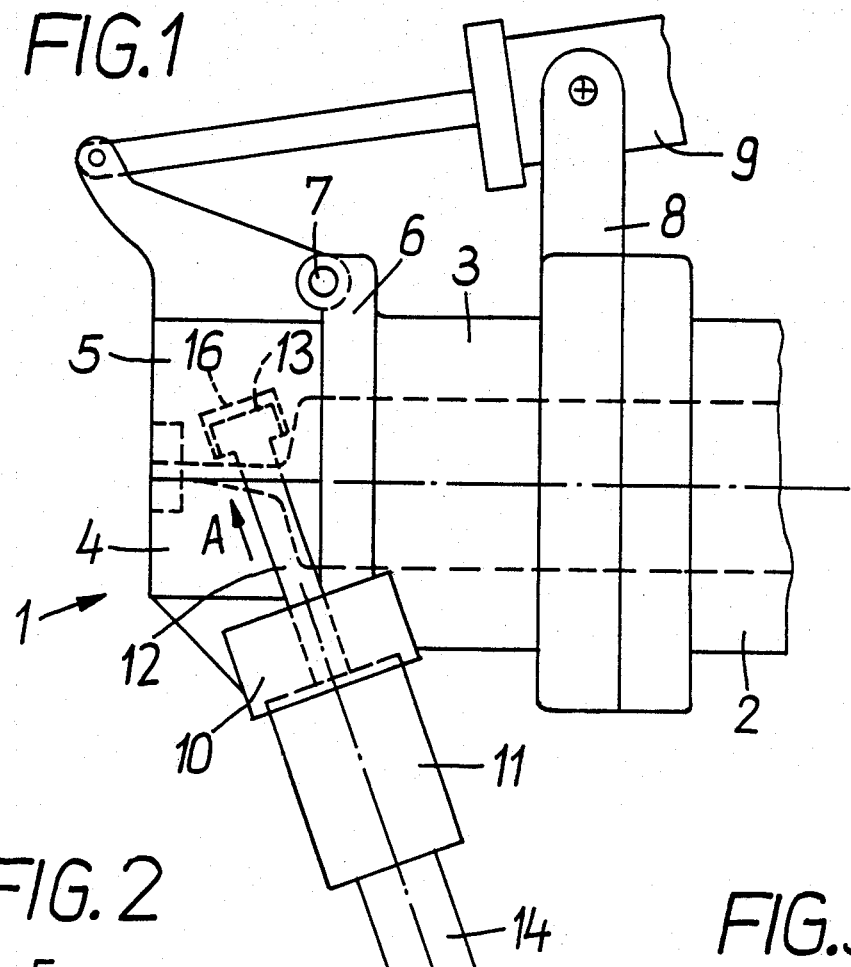
FIG. 1 is a side elevational view of a simple extruder head with an associated pivotable upper head member and a stationary lower head member.
Figure 2:
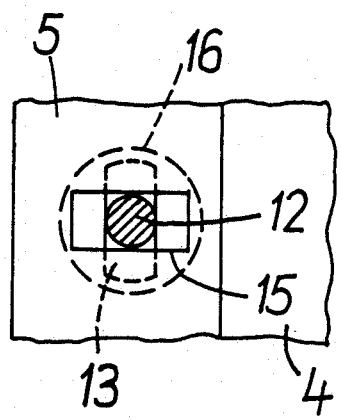
FIG. 2 is a cutaway partial plan view of an opening in the extruder head of FIG. 1 for the piston rod of a hydraulic cylinder as seen inclined according to the arrow A of FIG. 1.
Figure 3:
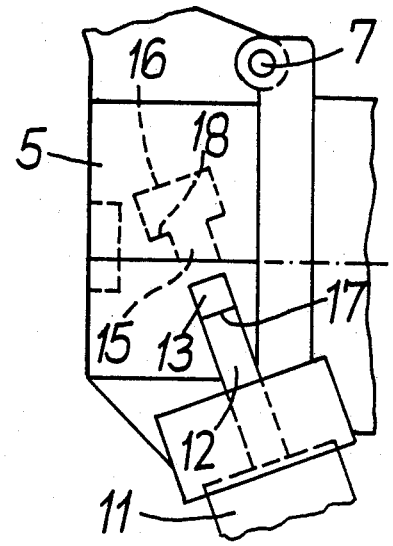
FIG. 3 is a cutaway partial side elevational view of the extruder head according to FIG. 1 with piston rod pulled back.

The extruder head 1 according to FIGS. 1 to 3, in which for structural simplicity no clamping wedges or keys for clamping the final or finishing die (plate) and the preforming die is exemplified, has a machine head member 3 attached to the extruder 2, a fixed lower head member 4 attached to it and a pivotable upper head member 5 which is jointedly mounted rotatable about an axis 7 located on a flange 6 of the machine head member 3 and is pivotable upwardly with the help of a hydraulic cylinder 9 supported on a shoulder 8 of the machine head member 3.

On the lower end of the machine head member 3 is mounted on each side a bracket 10 with a hydraulic clamping cylinder 11. The piston rod 12 of the cylinder 11 is extendable in the direction of the pivotable upper head portion 5 and has a hammer like head 13 at its end. The hydraulic cylinder 11 is provided with a turning device or rotator 14 which can rotate the piston rod 12 about 90°. The particular rotation can be effected stepwise or alternatingly.

The ends of the extruder upper head member 5 projecting laterally against the lower head member 4 show a rectangular opening 15 extending in a transverse direction whose interior dimensions are slightly greater than the outer dimensions of the hammer like head 13 of the piston rod 12 and which connects to or goes over into an undercut cylindrical recess 16.

On closing of the extruder head 1 the pivotable upper head member 5 with the hydraulic cylinder 9 is moved downward for contact on the fixed lower head member 4. Then the piston rod 12 turns about 90° by action of the turning device or rotator 14 and travels from the position shown in FIG. 3 through the opening 15 provided in the upper head member 5 into the recess and/or cavity 16 so that the pressing or contacting surface 17 of the hammer like head 13 stands opposite the corresponding pressing and contacting surface 18 of the cavity or recess 16.

Then the hydraulic cylinder 11 is acted on in the sense that the contacting surface 17 of the hammer head 13 presses on the contacting surface 18 of the recess 16 and thus the upper head member 5 is pressed against the lower head member 4 and the machine head member 3 (see FIG. 1).

To loosen the upper head member 5 the hydraulic cylinder is next again relieved, the piston rod 12 is rotated by the turning device or rotator 14 about 90° and the piston rod 12 is drawn back through the opening 15 into the position shown in FIG. 3.

In one variant of the above embodiment the head 13 of the piston rod 12 can be shaped like a star with, for embodiment, three radially extending projections distributed uniformly around its periphery (this is not illustrated). The opening 15 is formed correspondingly and the pivot angle of the turning device or rotator 14 is substantially only 60°.

Figure 4:
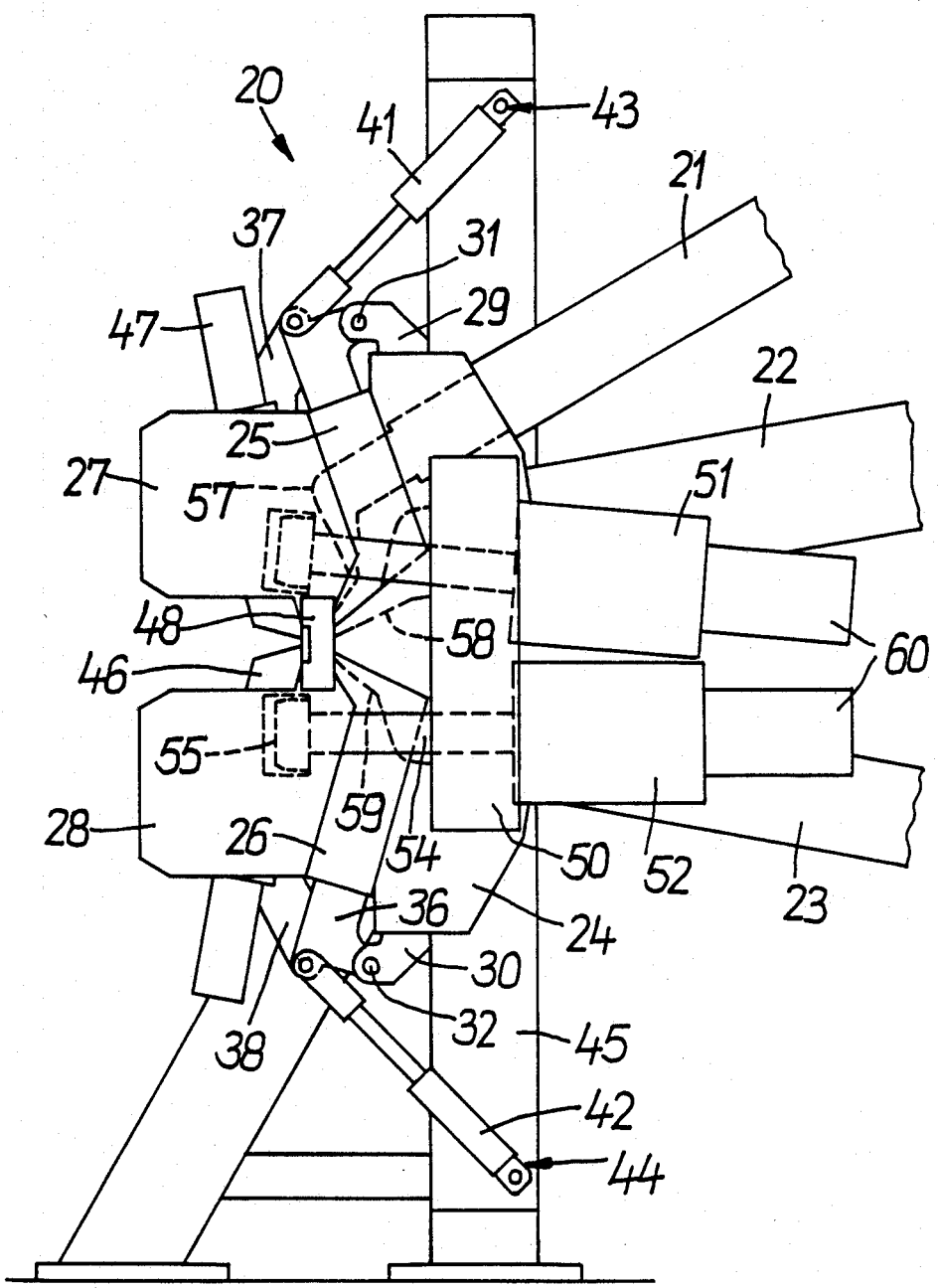
FIG. 4 is a side elevational view of a triple extruder head with two pivotable outer head members and two corresponding intermediate members shown in a closed state.

A triple extruder head 20 with three extruders 21, 22 and 23 is shown in FIG. 4. It is also possible without more to provide a nonillustrated fourth extruder under the third extruder 23. This extruder head 20 has a stationary central portion 24 with an upper and a lower pivotable intermediate member 25, 26 and a pivotable outer upper and lower head member 27, 28.

The central portion 24 has an upper and lower retaining device 29, 30 with a fixed supporting axle 31, 32. The intermediate member 25, 26, the upper head member 27 and the lower head member 28 are pivotally mounted on the upper and/or lower axles 31, 32.

To swing out and swing back the pivotable head members and intermediate members 25 ... 28 a hydraulic cylinder 41, 42 is provided top and bottom, which is pivotally connected at points 43 and/or 44 on the stationary frame or frame member 45. In FIG. 4 the hydraulic cylinder 41 for the upper head member 27 and the hydraulic cylinder 42 for the lower head member 26 are omitted on account of clarity. The hydraulic cylinders 41, 42 for the outer upper and lower head members 27, 28 and the intermediate members 25, 26 are to be considered offset displaced perpendicular to the plane of the drawing. The upper and lower head member 27, 28 each have a clamping wedge 46 guided on it. The clamping wedges 46 are moved in a known way by the hydraulic cylinders 47 for clamping or loosening of a preforming die 48 with a final or finishing die (plate).

Brackets 50 are mounted on the outside of the central portion 24. Two hydraulic cylinders 51, 52 are supported on these brackets 50. The piston rods 53, 54 of these hydraulic cylinders 51, 52 have as mentioned before have a hammer like end and/or a hammer shaped head 55 and are extendable in the direction of the upper and lower head members 27 and/or 28.

The upper and lower head members 27 and/or 28, which are wider than the intermediate members 25, 26, have an opening 56 as has already been described in this specification for the embodiment according to FIGS. 1 to 3 (there the opening is given the reference number 15).

On clamping the upper and the lower head members 27, 28 the intermediate members 25, 26 are clamped fast against the central portion 24 so that the entire extruder head 1 forms a properly operable unit.

Figure 5:
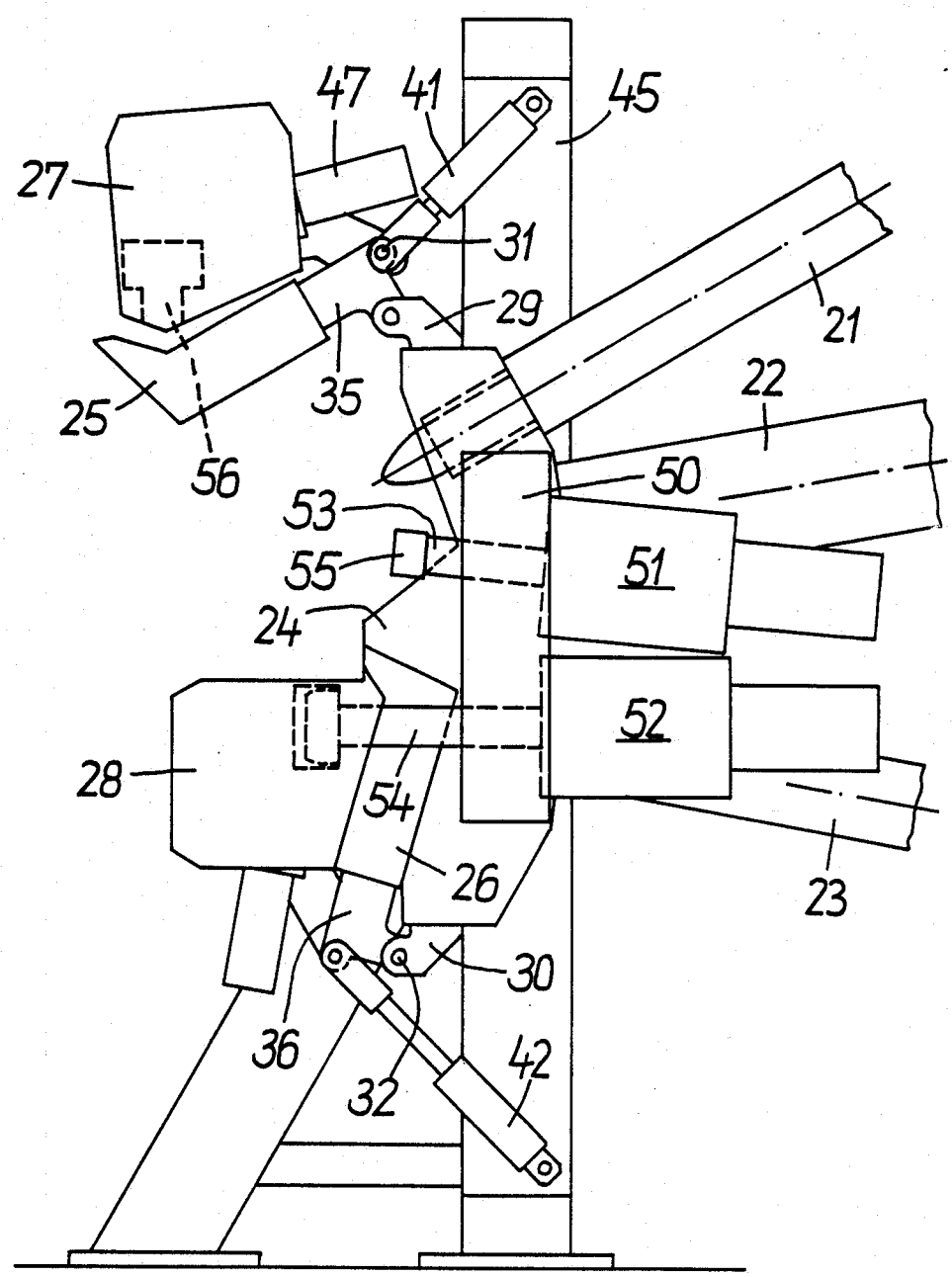
FIG. 5 is a side elevational view of the device according to FIG. 4 with upper head members and intermediate members in a partially open state.

In FIG. 5 the upper head member is shown in the open and the lower head member in the closed condition.

In this state of the extruder head 20 the stock passages 57, 58 (in FIG. 4 indicated with dashed lines) associated with the extruders 21, 22 are cleaned independently of the stock passage 59 associated with the extruder 23.

The hydraulic cylinder 51, 52 has, as does the hydraulic cylinder according to FIG. 1, a turning device or rotator 60.

Figure 6:
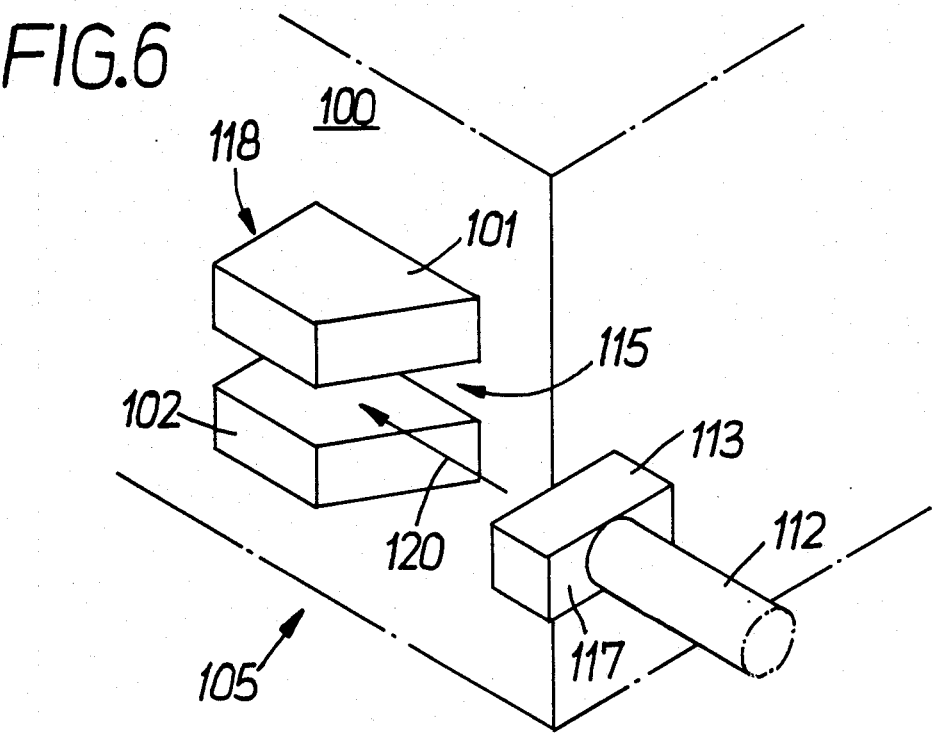
FIG. 6 is a cutaway partial perspective view of a pivotable extruder head member with two lateral projections and the hammer head shaped end of a piston rod.
Figure 7:
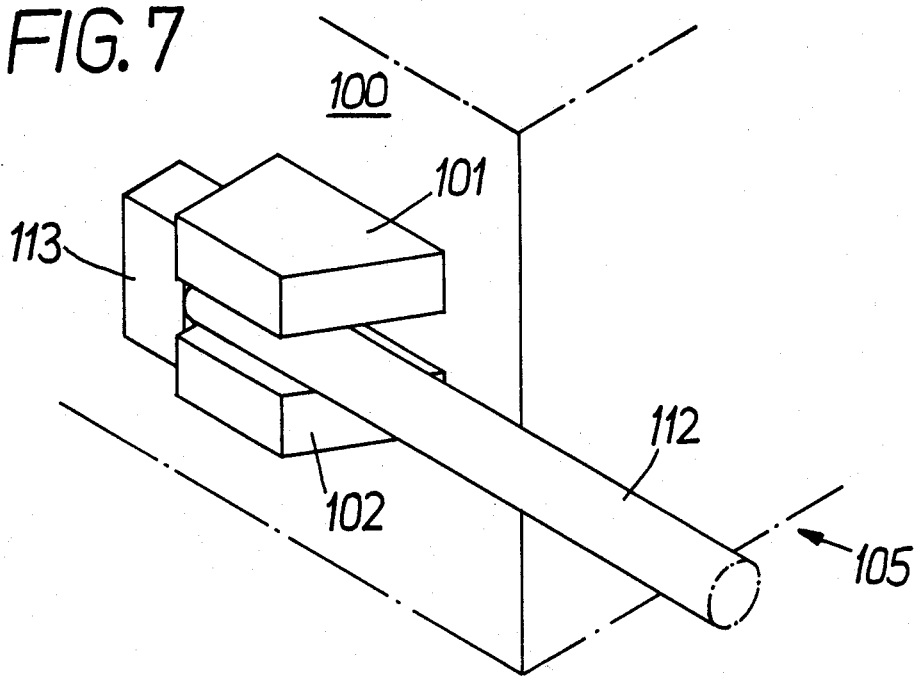
FIG. 7 is a similar cutaway partial perspective view of a an extruder head member after engagement and clamping by the piston rod.

In FIGS. 6 and 7 a pivotable extruder head member 105 with a reduced width in contrast to that of the embodiment according to FIGS. 1 to 3 is shown. On its lateral surfaces 100 the head member 105 is provided with parallel lateral projections 101, 102 running parallel to the axis of the piston rods 112 between which a cavity and/or an intermediate space 115 is provided whose interior measurements are slightly larger than the outer dimensions of the hammer like head 113 of the piston rods 112.

The projections 101, 102 each have at least one contacting surface 118 on the side facing away from the piston rod 11.

For clamping the extruder head member 105 the piston rod 112 travels in the direction of the arrow 120 until behind the projections 101, 102 with the head 113 aligned parallel to the cavity 115.

After that the piston rod 112 is rotated once about 90° and pulled opposite the direction indicated by the arrow 120 so that the contacting surface 117 of the hammer like head 113 contacts on the contacting surface 11B of the projections 101, 102 and the head member 105 is pressed against another head member (which is not shown in the drawing) opposite the direction indicated by the arrow 120.

Figure 8:
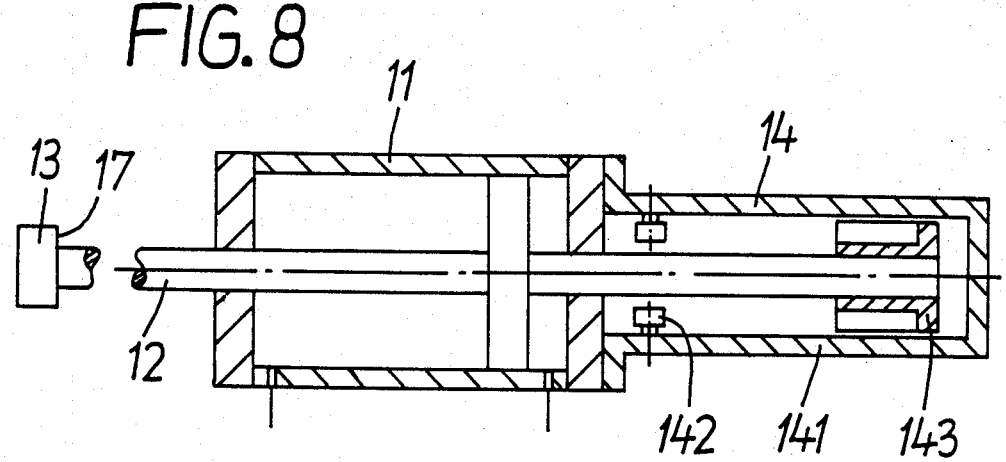
FIG. 8 is a longitudinal cross sectional view of a turning device or rotator associated with a clamping cylinder.
Figure 9:
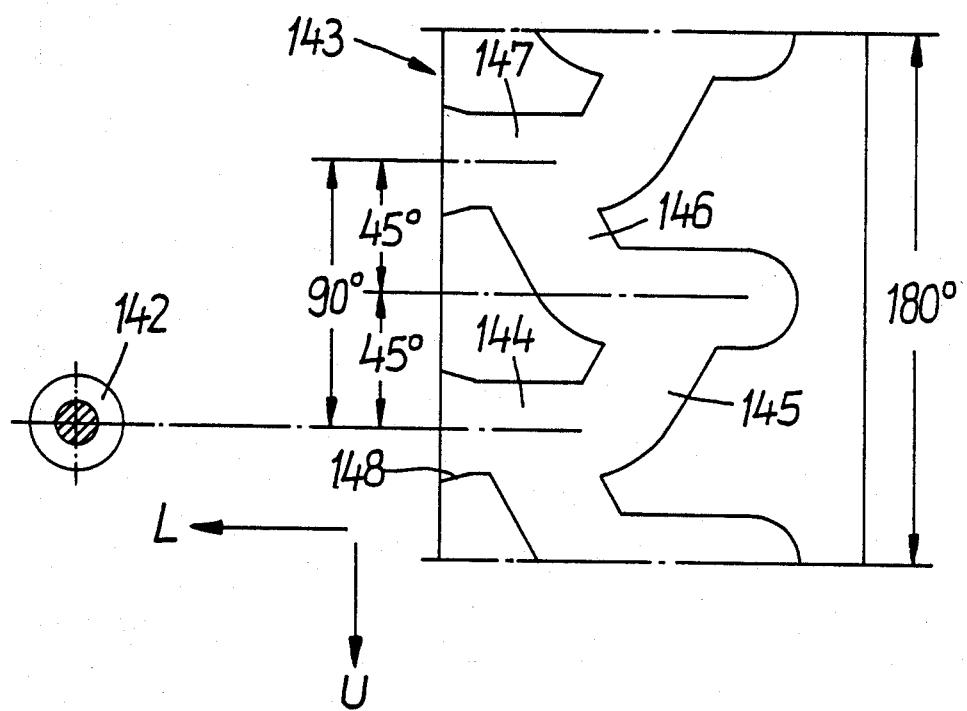
FIG. 9 is a partial developed view of the outer surfaces of the cam sleeve and a fixed guide roller of the turning device or rotator of FIG. 8.

In FIGS. 8 and 9 an advantageous embodiment of a turning device or rotator 14 is illustrated. The turning device or rotator 14 has a hollow cylindrical housing 141 on whose inner surface two guide rollers 142 are positioned opposite each other.

The piston rod 12 has a fixed cam sleeve 143 attached to its end opposite the hammer shaped head 13.

The path or course of cam groove arrangement of the cam sleeve 143 is illustrated in FIG. 9 which is planar map of the circumferential surface of the cam sleeve 143 as it develops over half a circumference and is described below as an aid to understanding the operation of the turning device or rotator 14.

When the upper head member 5 of the extruder head 1 has been moved against the stationary lower head member 4 by the hydraulic cylinder 9, the chamber of the cylinder 11 shown on the right in FIG. 8 is pressurized so that the piston, the piston rod 12 and the hammer like head 13 moves to the left in a no-load or return stroke in the direction of the cavity 16 in the upper head member 5. The head member 13 is aligned to fit the opening 15 of the cavity 16 (see FIG. 2). The cam sleeve 143 is moved to and on the guide rollers 142.

For simplicity the path or course of the cam sleeve 143 is described only with the aid of a single one of both guide rollers 142.

The cam sleeve 143 slides on the guide roller 142 in the longitudinal direction L with an axially parallel guide section 144. When during a further longitudinal motion the inclined running curved guide section 145 slides over the guide roller 142, the cam sleeve 143 performs, together with the hammer shaped head 13, a rotational motion (angular displacement) of 45° until the end of the no-load or return stroke.

In the reverse motion direction for cam sleeve 143, i.e. opposite the direction L, the guide roller 142 is engaged by a second inclined guide section 146 so that the cam sleeve 143 and the hammer shaped head 13 experience an additional rotation of about 45° in the peripheral direction when the additional axially parallel curved member 147 engages the guide roller 142.

The hammer shaped head 13 thus has experienced a total rotation of $2 \times 45° = 90°$ inside the cavity 16 of the pivotable upper head member 5, i.e. at the limit of the no-load or return stroke.

On further motion opposite the direction L the contacting surface 17 of the hammer shaped head 13 reaches the contacting surface 18 of the upper head member 5 so that it is pressed on the stationary lower head member 5 and clamped on it on further action of the chamber of the cylinder 11 shown on the left in FIG. 8.

When the cam sleeve 143 does not engage the guide roller 142 over a large portion of the stroke, the piston rod remains in its same present rotational position because of the friction present.

Thus the sliding of the linear guide section 144 on the guide roller 142 occurs without problems when inclined guiding surfaces 148 are provided at the beginning of these guide members.

The embodiment of the turning device or rotator 14 described can be used correspondingly for the turning device or rotator 60.

Besides the described embodiments the turning device or rotator 14 and/or 16 can also be a rotating motor and/or a rotating cylinder as described in the Publication Nr. 43 "Neues von MECMAN. Drehzylinder Serie 1561. Ergänzung zum Mecman Hauptkatalog", September 1969, of MECMAN GMBH, 2000 Hamburg 1, Bundesrepublik Deutschland. In the embodiment of the turning device or rotator 14 and/or 60 which comprises a rotating motor a longitudinal motion of the hammer shaped head 13 during rotation can be omitted.

By "branched groove" referred to in the claims following and in the summary I mean the individual guide sections 144, 147, 146 and 145 which are grooves in the surface of the cam sleeve 143.

By "connection means" I mean at least two radial projections on the piston rod distributed uniformly about the circumference of the piston rod and a passage corresponding to the shape of the projection with a contacting surface in and/or, on the associated head member.

I claim:

1. In an extruder head with at least one pivotable head member rotatable about an axis, a stationary head member and, on each side, at least one hydraulic cylinder for clamping said at least one pivotable head member to said stationary head member to form an operable unit, the improvement wherein two of said hydraulic cylinders are mounted rigidly each on one side of said stationary head member and each of said hydraulic cylinders is associated with a respective one of said pivotable head members, a piston rod of each said hydraulic cylinder being extendable in a direction to the respective pivotable head member which contacts on said stationary head member and a releasable clamping means on said piston rod disposable to engage and clamp said pivotable head member against said stationary head member with said piston rod being under tension.

2. The improvement defined in claim 1 wherein said releasable clamping means comprises at least two radial projections distributed uniformly circumferentially on the piston rod, said projections being provided with a pressing surface directed toward said hydraulic cylinder, and the respective pivotable head member has a passage on each side corresponding in shape to said projection with a contacting surface facing away from said hydraulic cylinder, and further wherein said piston rod is rotatable by a turning device or rotator about half a partial angle determined by the number of said projections.

3. The improvement defined in claim 2 wherein said passage is formed by an opening suitable for said projections in the associated one of said head members with an undercut recess and said contacting surface of said head member is formed by the extension of said opening into said recess.

4. The improvement defined in claim 2 wherein said passage and said contacting surface are formed by two lateral projections of said pivotable head members.

5. The improvement defined in claim 2 wherein said turning device or rotator has a cam groove arrangement with a plurality of branched grooves and guide rollers, a rotation of said piston rod being caused by at least one of said guide rollers engaged with said branched grooves in one inclined curved section of said guide branched grooves running into another of said guide sections substantially axially parallel with said piston rods.

6. The improvement defined in claim 2 wherein said turning device or rotator is a rotating motor.

7. An extruder head comprising:
a stationary head member;
at least two pivotable head members swingable about respective axes;
a hydraulic cylinder on each side of said stationary head member for clamping a respective said pivotable head member to said stationary head member in an operable unit, a piston rod of each of said hydraulic cylinders being extendable in a direction to one of said pivotable head members which contacts on said stationary head member; and
a releasable clamping means on said piston rod disposed to engage and clamp said pivotable head member against said stationary head member with said piston rod being under tension, and in which said piston rod has at least two radial projections distributed uniformly circumferentially with a pressing surface directed toward said hydraulic cylinder and said pivotable head member has a passage on each side corresponding in shape to said projection with a contacting surface facing away from said hydraulic cylinder and said piston rods are rotatable by a turning device about half a partial angle determined by the number of said projections, said passage being formed by an opening suitable for said projections in the associated one of said head members with an undercut recess and said contacting surface of said head member being formed by the extension of said opening into said recess.

8. An extruder head comprising:
a stationary head member;
at least two outer pivotable head members and two pivotable intermediate head members swingable about respective axes;
a hydraulic cylinder on each side of said stationary head member with each of the outer ones of said pivotable head members for clamping a respective outer one and an intermediate one of said pivotable head members to said stationary head member in an operable unit, a piston rod of each of said hydraulic cylinders being extendable in a direction to one of said outer pivotable head members which contacts on one of said intermediate members while said intermediate member contacts on said stationary head member; and
a releasable clamping means on said piston rod disposed to engage said outer pivotable head member and to clamp said outer pivotable head member and said intermediate head member against said stationary head member with said piston rod being under tension, in which said piston rod has at least two radical projections distributed uniformly circumferentially with a pressing surface directed toward said hydraulic cylinder and said outer pivotable head member has a passage on each side corresponding in shape to said projection with a contacting surface facing away from said hydraulic cylinder and said piston rods are rotatable by a rotator about half a partial angle determined by the number of said projections, said passage being formed by an opening suitable for said projections in the associated one of said outer head members with an undercut recess and said contacting surface of said outer head member being formed by the extension of said opening into said recess.

* * * * *